United States Patent [19]

Winbow et al.

[11] Patent Number: 4,606,014

[45] Date of Patent: Aug. 12, 1986

[54] ACOUSTIC DIPOLE SHEAR WAVE LOGGING DEVICE

[75] Inventors: Graham A. Winbow, Houston; Sen-Tsuen Chen, Sugar Land, both of Tex.

[73] Assignee: Exxon Production Research Co., Houston, Tex.

[21] Appl. No.: 395,449

[22] Filed: Jul. 6, 1982

[51] Int. Cl.$^4$ .................................................. G01V 1/40
[52] U.S. Cl. ........................................ 367/75; 367/157; 367/180; 181/104; 181/108
[58] Field of Search ............... 367/75, 140, 912, 911, 367/180, 157, 25, 160; 181/104, 108, 106, 113; 310/333, 368

[56] References Cited

U.S. PATENT DOCUMENTS

| | | | |
|---|---|---|---|
| 3,048,815 | 8/1962 | Thurston et al. | 367/160 |
| 3,208,546 | 9/1965 | Lash | 367/75 |
| 3,325,780 | 6/1967 | Horan | 367/164 |
| 3,354,983 | 11/1967 | Erickson et al. | 367/75 |
| 3,363,118 | 1/1968 | Sims | 367/160 |
| 3,407,384 | 10/1968 | Wiley | 367/157 |
| 3,593,255 | 7/1971 | White | 367/75 |
| 4,059,820 | 11/1977 | Turpening | 367/140 |
| 4,286,332 | 8/1981 | Edelmann | 367/75 |
| 4,394,754 | 7/1983 | Waters | 367/75 |

FOREIGN PATENT DOCUMENTS

| | | | |
|---|---|---|---|
| 727792 | 2/1966 | Canada | 367/160 |
| 031989 | 7/1981 | European Pat. Off. | |
| 1193381 | 5/1970 | United Kingdom. | |

OTHER PUBLICATIONS

Erickson, Daniel S., "Downhole Shear Wave Velocity Measurements," Thesis, Colorado School of Mines, 9/78.

Reynolds III, et al., "Consider Piezoelectric Ceramics:...", Electronic Design 19, Sep. 13, 1977, pp. 92–97.

Sheriff, R. E., Encyclopedic Dictionary of Exploration Geophysics, 1973, pp. 6–7.

Winbow, G. A., "How to Separate Compressional and Shear Arrivals in a Sonic Log", 50th Annual AIMSEG, 11/17–20/80.

Biot, M. A., "Propagation of Elastic Waves in a Cylindrical Bore Containing a Fluid," Journal of Applied Physics, vol. 23, No. 9, pp. 997–1005 (1952).

Primary Examiner—Nelson Moskowitz
Assistant Examiner—Ian J. Lobo
Attorney, Agent, or Firm—James S. Hsue; Alfred A. Equitz

[57] ABSTRACT

The preferred embodiment of this invention includes a logging sonde, an elongated pair of oppositely polarized piezoelectric plates connected to each other by their flat surfaces, and an electrical pulse applying means for applying electrical pulses across the pair of plates so as to bend and vibrate the plates in a direction perpendicular to the length of the plates. Vibration of the plates in a fluid contained in a well creates in the fluid a positive compressional wave in one direction and simultaneously a negative compressional wave in the opposite direction. The two compressional waves will interfere to produce a dipole shear wave in the earth surrounding the well. The dipole shear wave arrival is detected at two locations in the fluid spaced longitudinally along the well from each other and from the plate. The ratio of the time interval between the detections of the dipole shear wave arrival at the two locations to the distance between the two locations yields the shear wave velocity of the earth around the well. The length of the plates may be selected to generate dipole shear waves with frequencies in a preferred range so as to improve shear wave signal to compressional wave noise ratio.

2 Claims, 4 Drawing Figures

ACOUSTIC DIPOLE SHEAR WAVE LOGGING DEVICE

This invention relates to well logging in general and more particularly, to acoustic shear wave well logging.

BACKGROUND OF THE INVENTION

In acoustic well logging, it is customary to measure the compressional wave velocity of earth formations surrounding boreholes. A conventional compressional wave velocity logging system includes a cylindrical logging sonde suitable to be suspended downhole in the borehole fluid, a source connected to the sonde for generating compressional waves in the borehole fluid, and one or more detectors connected to the sonde and spaced apart from the compressional wave source for detecting compressional waves in the borehole fluid. A compressional wave in the borehole fluid generated by the source is refracted into the earth formation surrounding the borehole. It propagates through a portion of the formation and is refracted back into the borehole fluid at a point adjacent to the detector and is then detected by the detector. The ratio of the distance between the source and detector to the time between generation and detection of the compressional wave yields the compressional wave velocity of the formation. The distance between source and detector is usually fixed and known so that measurement of the time between compressional wave generation and detection is sufficient to determine the compressional wave velocity of the formation. For better accuracy, such distance is usually much greater than the dimensions of the source or detector. Information important for production of oil and gas from subterranean earth formations may be derived from the compressional wave velocities of such formations.

When a compressional wave generated by a compressional wave source in the borehole fluid reaches the borehole wall, it produces a refracted compressional wave in the surrounding earth formation as described above. In addition, it also produces a refracted shear wave in the surrounding earth formation and guided waves which travel in the borehole fluid and the part of the formation adjacent to the borehole. Part of such shear wave is refracted back into the borehole fluid in the form of a compressional wave and reaches the detector in the logging sonde. The guided waves are also detected by such detector. Any wave that is one of the three types of waves detected by the detector may be called an arrival: the compressional waves in the borehole fluid caused by refraction of compressional waves in the formation the compressional wave arrivals, those caused by refraction of shear waves in the formation the shear wave arrivals, and those caused by guided waves the guided wave arrivals. Thus, the signal detected by the detector is a composite signal which includes the compressional wave arrival, the shear wave arrival and the guided wave arrivals. In earth formations compressional waves travel faster than shear waves and shear waves in the formation usually travel faster than the guided waves. Therefore, in the composite signal detected by the detector, the compressional wave arrival is the first arrival, the shear wave arrival the second arrival, and the guided wave arrivals the last arrivals. In measuring the compressional wave velocity of the formation, the time interval between generation of compressional waves and detection of the first arrival detected by the detector gives the approximate travel time of the refracted compressional wave in the formation. Hence the later shear wave and guided wave arrivals do not affect measurement of compressional wave velocity of the formation.

In addition to traveling over a vertical distance in the formation approximately equal to the distance between the source and detector, the compressional wave also travels over short distances in the fluid. The extra time required to travel such short distances introduces errors in the velocity log. To reduce such errors, conventional logging devices employ at least two detectors spaced vertically apart along the borehole from each other. The time interval between detection by the two detectors is measured instead of the time interval between transmission and detection. The ratio between the distance between the two detectors and such time interval yields the compressional wave velocity. Since the compressional wave travels over approximately equal short distances in the borehole fluid before reaching the two detectors, the time interval between detection by the two detectors is a more accurate measure of the actual travel time in the formation. Therefore, using two detectors and measuring the time between detection by the two detectors yield a more accurate compressional wave velocity. Other spurious effects such as borehole-size changes and sonde tilt may be reduced by conventional devices. One such device is described in *Log Interpretation*, Volume 1—Principles, Schlumberger Limited, New York, N.Y. 10017, 1972 Edition, pages 37–38.

It is well known that shear wave velocity logging may also yield information important for production of oil and gas from subterranean earth formations. The ratio between the shear wave velocity and compressional wave velocity may reveal the rock lithology of the subterranean earth formations. The shear wave velocity log may also enable seismic shear wave time sections to be converted into depth sections. The shear wave log is also useful in determining other important characteristics of earth formations such as porosity, fluid saturation and the presence of fractures.

The conventional compressional wave logging source and the compressional waves it generates in the borehole fluid are symmetrical about the logging sonde axis. When such compressional waves are refracted into the surrounding earth formation, the relative amplitudes of the refracted shear and compressional waves are such that it is difficult to distinguish the later shear wave arrival from the earlier compressional wave arrival and from the reverberations in the borehole caused by refraction of the compresional wave in the formation. Therefore it is difficult to use a conventional symmetrical compressional wave source for logging shear wave velocity. Correlation techniques have been employed to extract the shear wave arrival from the full acoustic wave train recorded. Such techniques, however, usually require processing of data by using a computer so that shear wave velocities cannot be logged on line. It may also be difficult to extract the shear wave arrival if it is close in time to the compressional wave arrival.

Asymmetric compressional wave sources have been developed for logging shear wave velocity. Using such sources, the amplitude of the shear wave arrival may be significantly higher than that of the compressional wave arrival. By adjusting the triggering level of the detecting and recording systems to discriminate against the compressional wave arrival, the shear wave arrival is detected as the first arrival. It may thus be possible to determine the travel time of shear waves in the formation and therefore the shear wave velocity. Asymmetric sources are disclosed by Angona et al, European Patent Application No. 31989, White, U.S. Pat. No. 3,593,255, and Kitsunezaki, U.S. Pat. No. 4,207,961.

Angona et al disclose a bender-type source which comprises two circular piezoelectric plates bonded together and attached to a logging sonde by their perimeters. When voltage is applied across the two piezoelectric plates, the center portion of the circular plates will vibrate to create a positive compressional wave in one direction and a simultaneous negative compressional wave in the opposite direction. The two compressional waves will interfere to produce a shear wave in the earth surrounding the borehole.

It is explained in the last paragraph of page 8 of Angona et al. that the shear wave so produced has an amplitude which "is at a maximum in a plan of the operating faces of the bender-type transducer and falls off as a cosine function until it reaches a minimum after displacement through an angle of 90°." Such a shear wave, having amplitude which varies as a cosine function of azimuthal angle, will sometimes be referred to herein as a "dipole" shear wave. The dipole-shear wave produced by the Angona et al. device has frequencies which are inversely related to the diameter of the circular plates. Such diameter cannot exceed the diameter of the logging sonde which in turn is limited by the diameter of the borehole. Because of this limitation, the shear waves generated by the bender-type source disclosed by Angona et al will have a limited frequency range, and the source may be inefficient for generating low frequency shear waves.

White discloses an asymmetric source comprising two piezoelectric segments each in the shape of a half hollow cylinder. The two segments are assembled to form a split cylinder. The two segments have opposite polarization and electrical voltage is applied to each segment, causing one segment to expand radially and simultaneously causing the other segment to contract radially, thereby producing a positive compressional wave in one direction and a simultaneous negative compressional wave in the opposite direction. The two compressional waves will interfere to produce a shear wave in the surrounding earth formation. The frequencies of the shear wave so generated are inversely related to the radius of the split cylinder. Since such radius cannot exceed the radius of the logging sonde which in turn is limited by the radius of the borehole, White's device is not suitable for generating low frequency signals for the purpose of shear wave logging.

In Kitsunezaki, coils mounted on a bobbin assembly are placed in the magnetic field of a permanent magnet and current is passed through the coils to drive the bobbin assembly. The movement of the bobbin assembly ejects a volume of water in one direction and simultaneously sucks in an equivalent volume of water in the opposite direction, thereby generating a positive compressional wave in one direction and a simultaneous negative compressional wave in the opposite direction. Kitsunezaki's asymmetric source, however, cannot be driven at high frequencies or with sufficient power required for harder formations. Also it cannot operate at great depths or under great pressures.

In another type of shear wave logging source, instead of coupling the source to the borehole wall through the medium of the borehole fluid, the source is either coupled directly to the borehole wall or through mechanical means such as mounting pads. Such shear wave logging sources are disclosed in Erickson et al, U.S. Pat. No. 3,354,983 and Vogel, U.S. Pat. No. 3,949,352.

SUMMARY OF THE INVENTION

The apparatus of the invention comprises a housing, adapted to be raised and lowered into a well containing a fluid, an elongated member having two ends with at lest one end attached to the housing. The apparatus of the invention further comprises means for vibrating the unattached portion of the member in a direction substantially perpendicular to its length to generate in the fluid a positive compressional wave in one direction and simultaneously a negative compressional wave in the opposite direction. The two compressional wave will interfere to produce a dipole shear wave in the earth surrounding the well. The dipole shear wave arrival is detected by a detecting means at at least one and preferably two locations in the fluid spaced longitudinally along the well from the member. From the time interval between the detections of the shear wave arrival at the two locations, the shear wave velocity of the earth surrounding the well may be determined.

Increasing the length of the member will decrease the frequencies of the dipole shear wave generated. Using a low frequency dipole source to log the shear wave velocities of soft earth formations will improve the dipole shear wave signal to compressional wave noise ratio.

Two substantially identical plates placed adjacent to each other in a well containing fluid with their flat surfaces substantially parallel to each other are vibrated in substantially the same manner but so that the vibrating portions of the two plates move substantially simultaneously towards and away from one another. Such vibrations will generate a Stoneley wave in the fluid which is detected at two locations spaced longitudinally along the well from each other and from the two plates. From the time interval between the detections at the two locations, the Stoneley wave velocity is determined. The shear wave velocity may be derived from the Stoneley wave velocity.

DESCRIPTION OF THE PREFERRED EMBODIMENTS

Figures 1, 2:
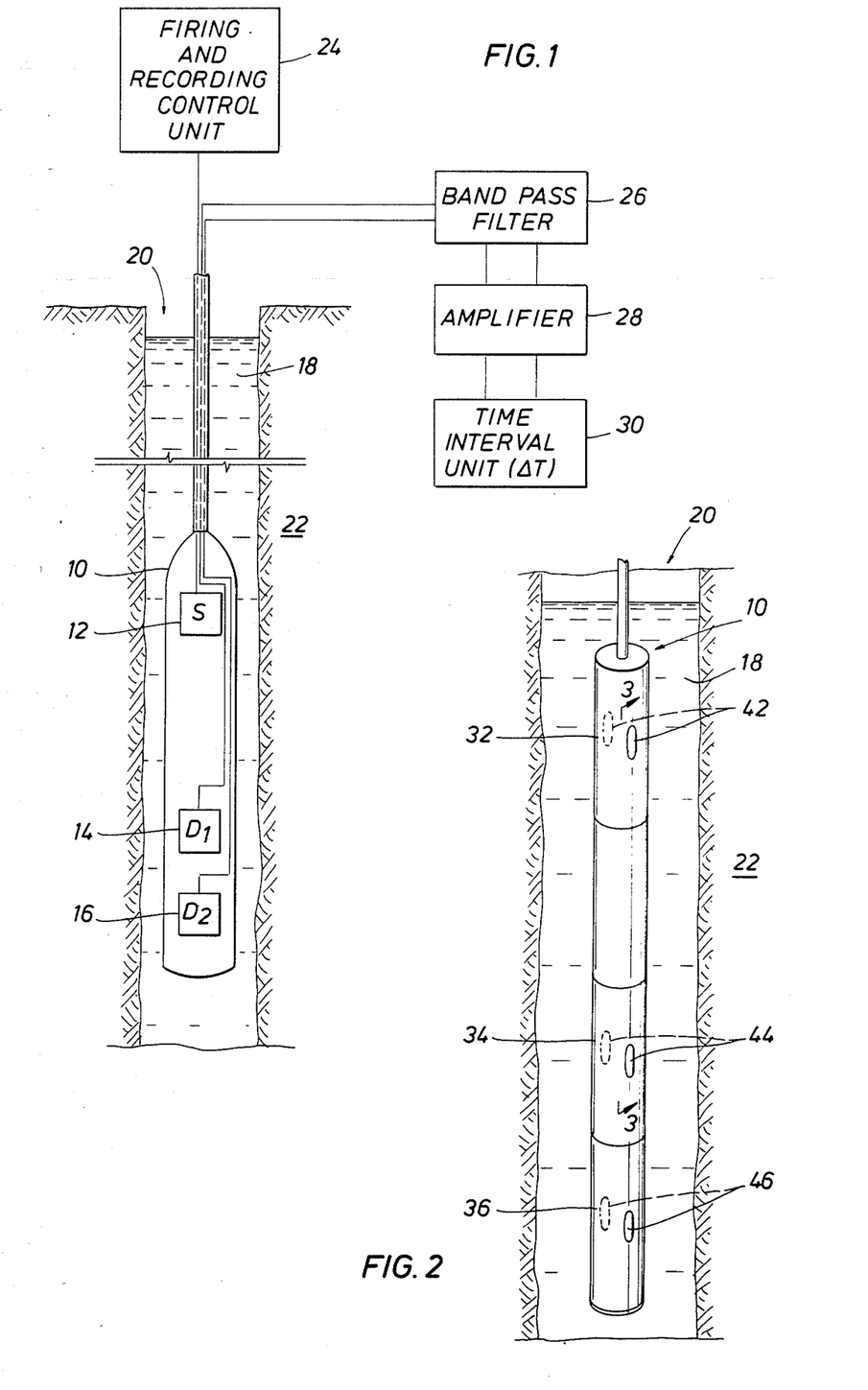
FIG. 1 is a schematic view of an acoustic logging system illustrating this invention.
FIG. 2 is a simplified perspective view of a dipole shear wave logging device illustrating an embodiment of the invention.

FIG. 1 is a schematic view of an acoustic logging system illustrating this invention. A logging sonde 10 is adapted to be raised and lowered into a well. The sonde contains a dipole shear wave source 12 and two detectors, 14, 16. To initiate logging, sonde 10 is suspended into a fluid 18 contained in a borehole 20, which is surrounded by an earth formation 22. Detectors 14, 16 are so connected to sonde 10 that they are spaced longitudinally along borehole 20 from each other and from source 12. Source 12 is connected to a firing and recording control unit 24. Although the firing and recording control unit is shown in FIG. 1 as a separate unit from the logging sonde, the part of the unit that powers the dipole shear wave source may, for convenience in operation, be housed by the logging sonde. Signals recorded by detectors 14, 16 are fed to a band pass filter 26, an amplifier 28 and a time interval unit 30.

In a manner explained below the firing and recording control unit is used to fire source 12 which produces a dipole shear wave in formation 22. The dipole shear wave arrival is detected by detectors 14 and 16. Sonde 10 also contains a pre-amplifier (not shown in FIG. 1) which amplifies the dipole shear wave arrival detected by detectors 14, 16. The amplified signals are then filtered by filter 26 and amplified again by amplifier 28. The time interval between the detection of the arrival by detector 14 and its detection by detector 16 is then measured by time interval unit 30. Such time interval may be stored or displayed as desired.

FIG. 2 is a simplified perspective view of a dipole shear wave logging device illustrating an embodiment of the invention. As shown in FIG. 2, logging sonde 10 comprises a number of hollow cylindrical sections. The top section 32 contains the dipole shear wave logging source 12 of FIG. 1 and has two oppositely situated windows 42 which allow the compressional waves generated by source 12 to propagate readily therethrough into the borehole fluid. Sections 34, 36 containing detectors 14 and 16 of FIG. 1 are located below source 12 and also have windows 44, 46 as shown in FIG. 2. The combined compressional waves generated by source 12 propagate through windows 42 and borehole fluid 18 to reach the wall of borehole 20. A portion of such combined compressional waves is refracted into earth formation 22 in the form of a dipole shear wave. After such shear wave travels a distance through the formation, portions of it are refracted back into the borehole into borehole fluid 18 to reach detectors 14 and 16 through windows 44 and 46 respectively. The time interval between the detections by detectors 14 and 16 are then measured as described.

Figures 3, 4:
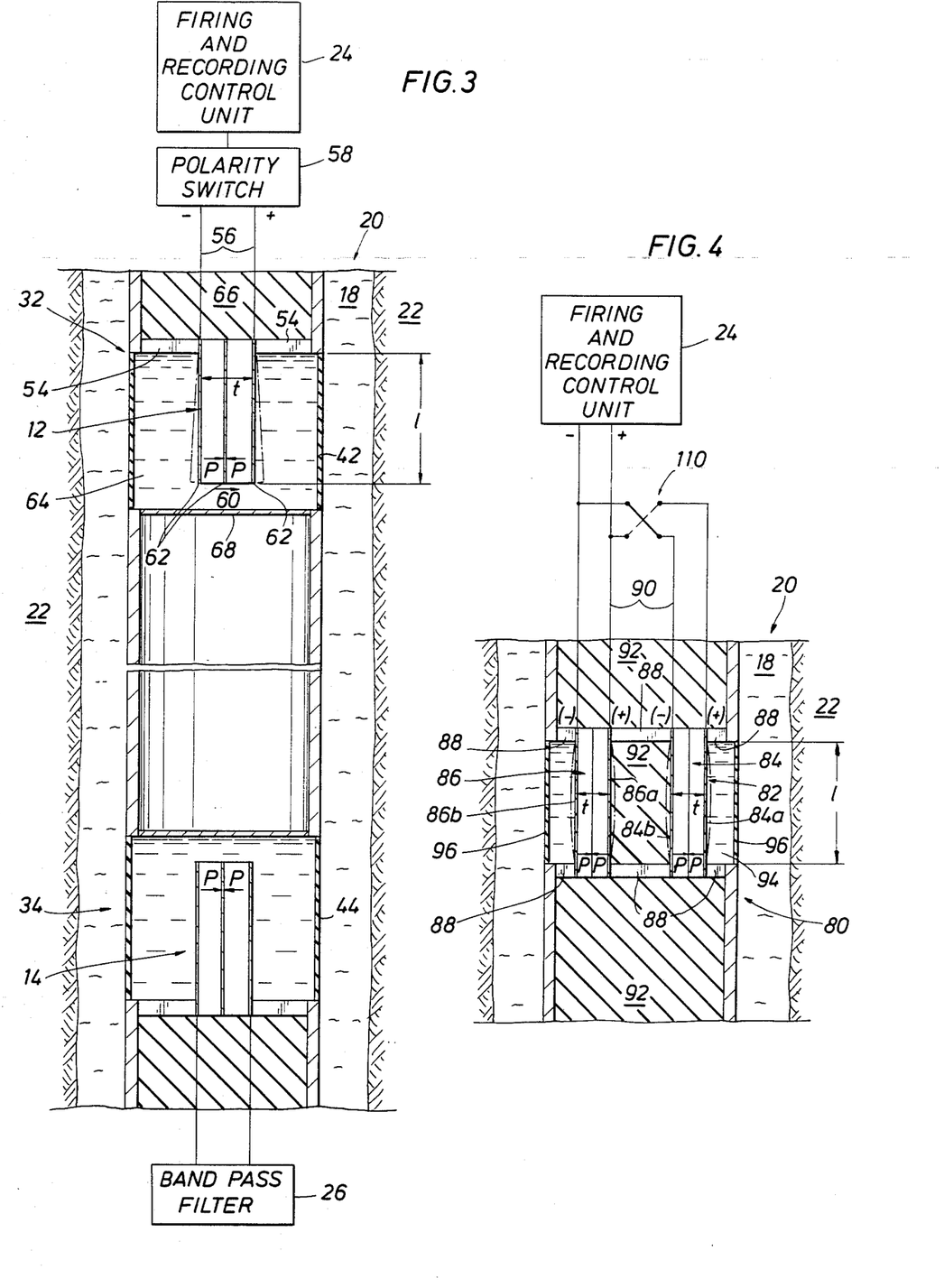
FIG. 3 is a partial cross-sectional view of a dipole shear wave device taken along the line 3—3 in FIG. 2.
FIG. 4 is a partial cross-sectional view of a dipole shear wave logging source illustrating the preferred embodiment of this invention.

FIG. 3 is a partial cross-sectional view of a dipole shear wave logging device taken along the line 3—3 in FIG. 2. As shown in FIG. 3, the dipole shear wave logging source 12 consists of a pair of elongated piezoelectric plates having two ends connected together by their flat surfaces to form a composite plate 12. Each of the two plates is polarized substantially perpendicularly to its flat surface and the polarizations of the two plates are in substantially opposite directions. One end of the composite plate 12 fits snuggly between two clamping plates 54 which keep the composite plate in place while it is vibrating. The outside exposed flat surfaces of the composite plate 12 are connected by wires 56 to the firing and recording control unit 24 through a polarity switch 58. The firing and recording control unit applies an electrical pulse across the composite plate 12. It is well known that if an electrical pulse is applied across the two flat surfaces of a member comprising a pair of oppositely polarized piezoelectric plates, it will cause the member to bend. If the polarity of the pulse applied is as shown in FIG. 3, the unattached portion of elongated composite plate 12 will bend in the direction of arrow 60 shown in FIG. 3.

When the unattached portion of composite plate 12 bends in the direction of arrow 60, it creates a positive compressional wave in the same direction and simultaneously a negative compressional wave in the opposite direction. A portion of the combined compressional waves resulting from the interference of the two compressional waves will refract into earth formation 22 as a dipole shear wave. The two compressional waves will interfere so that the compressional wave refracted into the earth formation and then detected by detectors 14, 16 is substantially smaller in amplitude than the refracted dipole shear wave. Therefore, by adjusting the triggering level of the time interval unit 30, the dipole shear wave is detected as the first arrival.

For better efficiency, the flat surfaces of source 12 are preferably parallel to the well axis, although other orientations are acceptable. While the polarizations of composite plate 12 are shown in FIG. 3 as and are preferably perpendicular to its flat surfaces, it will be understood that, for the signals to vibrate plate 12, the polarizations need only be such that they have components along the direction of the electrical field of the pulse applied across the composite plate. After the electrical pulse signal is applied, the unattached portion of plate 12 will continue to vibrate. The extreme position of plate 12 during its vibration are shown in dotted lines in FIG. 3.

The composite plate comprising the pair of oppositely polarized piezoelectric plates is readily available commercially. Piezoelectric composite plates supplied by the Vernitron Company of Bedford, Ohio, known as Bender Bimorphs have been satisfactory. The commercially available piezoelectric composite plates which may be used for the purpose of this invention are usually sold in the form of two piezoelectric plates connected through a conducting layer which is sandwiched between the two piezoelectric plates. The outside flat surfaces of the composite plates are also usually coated by conducting layers. Such conduction layers are shown in FIG. 3 as layers 62. Such conducting layers enable the electrical pulse applied across the composite plate to generate more uniform electric fields in such a plate and will improve the efficiency of the logging source. If the pair of piezoelectric plates in the composite plate 12 are polarized in substantially the same direction, in order to cause the composite plate to bend, the electric pulse should be applied between the sandwiched middle conducting layer and the two exposed outside conducting layers. The space surrounding source 12 and enclosed by the cylindrical section 32 is filled by oil 64. The upper portion of section 32 is filled by backing material 66 which preferably will have good damping qualities which will damp out the reverberations of source 12 so that the compressional waves generated by the source is short in duration. A diaphram 68 seals the oil 64 from the bottom portion of the section 32 which may be filled by air.

As shown in FIG. 3, the detector 14 is similar in construction to source 12. Section 34 and the manner it is connected to detector 14 are similar to section 32 and its connection to source 12. The only difference is that instead of connecting the outside exposed conducting layers of detector 14 to a firing circuit, such layers are connected to a band pass filter 26. The band pass filter is then connected to an amplifier and a time interval unit as shown in FIG. 1.

Preferably the flat surfaces of detector 14 are substantially parallel to the flat surfaces of source 12 and the directions of polarization of detector 14 are substantially parallel to the directions of polarizations of source 12. With such orientation, the shear wave arrivals detected by detector 14 will have optimum amplitude. It will be understood that other orientations may be used so long as the flat surfaces of detector 14 are not perpendicular to the flat surfaces of source 12. With such orientations detector 14 will detect the shear wave arrival. For better efficiency the flat surfaces of source 12 and of detector 14 are preferably parallel to the well axis although other orientations may also be used. For better sensitivity in detection the unattached end of detector 14 should point towards source 12 and the unattached end of source 12 towards detector 14. Detector 16 and section 36 (not shown in FIG. 3) are of the same construction as detector 14 and section 34 and are placed below detector 14.

While the detectors 14, 16 are shown as dipole type detectors, it will be understood that other detectors may be used. For example, a geophone with its axis at an angle to the flat surfaces of source 12 may be used. Preferably, such angle is 90°.

FIG. 4 is a partial cross-sectional view of a dipole shear wave logging source illustrating the preferred embodiment of this invention. As shown in FIG. 4 a cylindrical section 80 contains a dipole shear wave logging source 82 which comprises two pairs of elongated piezoelectric plates 84 and 86 each having two ends. The two pairs, 84 and 86, are each connected to the hollow cylindrical section 80 by being fitted snuggly at both ends between clamping plates 88. The two pairs of piezoelectric plates 84 and 86 are each of similar construction to the pair of piezoelectric plates 12 of FIG. 3. Thus the exposed flat surfaces of the two pairs are each coated by a conducting layer so that the outside flat surfaces of the two pairs are 84a, 84b and 86a, 86b respectively as shown in FIG. 4. Firing and recording control unit 24 applies an electrical pulse signal across each of the two pairs, 84 and 86, by means of wires 90 which are connected to the conducting layers coating the two pairs. As in the embodiment discussed above, such signal will cause the two pairs to each generate a positive compressional wave in one direction and a negative compressional wave in the opposite direction which will interfere to produce a dipole shear wave in the earth formation. If the electrical signal applied across each of the two pairs, 84 and 86, is such that the surface 84a is at a higher electrical potential than surface 84b and that surface 86a is at a higher electrical potential than surface 86b, then the dipole shear waves generated by the two pairs will add to generate a stronger dipole shear wave in formation 22. The space between the two pairs of plates and the space above and below the two pairs of plates and enclosed by cylindrical section 80 are filled by backing material 92 with good damping qualities so that the compressional waves generated by the vibration of the two pairs of plates will be short in duration. The compressional waves generated by the two pairs of plates are transmitted through oil 94 and windows 96 to borehole fluid 18. The shear wave arrival is detected by detectors in the same manner as in the embodiment discussed earlier. Since both ends of each of the two pairs of elongated piezoelectric plates 84 and 86 are clamped to section 80, only the middle portion of the two pairs of plates are free to vibrate. The extreme positions of the two pairs of plates during vibration are illustrated by dotted lines in FIG. 4.

As discussed above, the dipole shear wave source of this invention may be used to log shear wave velocities on line if the shear wave arrival is significantly greater in amplitude than the compressional wave arrival. This, however, is the case only when the frequencies of the dipole shear wave produced in the earth surrounding the borehole is within certain frequency ranges. For any earth formation, there is a preferred frequency range for logging its shear wave velocity so that the shear wave arrival is significantly stronger than the compressional wave arrival. Such preferred frequency range varies with the shear wave velocity of the formation to be logged. Thus, if the approximate range of shear wave velocities of the formation is known, a preferred range of frequencies can be chosen. For a well with ten inches diameter the preferred frequency ranges are shown in the table below.

| Approximate Range of Shear Wave Velocities | Preferred Frequency Range |
| --- | --- |
| 5000–6000 ft/sec | 1.5–7.5 kHz |
| 6000–7000 ft/sec | 3.0–12 kHz |
| 7000–8000 ft/sec | 4.0–16 kHz |
| 8000–9000 ft/sec | 4.5–20 kHz |

If a dipole shear wave source generates dipole shear waves with strong components at frequencies between 4.5 and 7.5 kHz, then such source operates in the preffered frequency ranges for the entire range of shear wave velocities, from 5,000 ft/sec to 9,000 ft/sec. The approximate range of shear wave velocities of a formation may be estimated by a conventional method, such as measuring the compressional wave velocities of the formation. The shear wave velocity is approximately one-half the pressure wave velocity. From the compressional wave velocities measured, the approximate range of shear wave velocities may be estimated.

The preferred frequencies vary inversely with the diameter of the well. Therefore for a well with diameter d inches instead of 10 inches, the preferred frequency ranges are given by those listed in the table above multiplied by a factor 10/d.

The frequencies of dipole shear waves generated in earth formations by the dipole shear wave sources 12 and 82 depend on the lengths of the elongated piezoelectric plates and the thicknesses of the pairs of plates in the direction of vibration. In the frequency spectrum of such a dipole shear wave, the frequency f of peak amplitude is given by:

$$f = K(t/l^2)$$

where
K is a constant
t is the thickness of the pair of piezoelectric plates in the direction of vibration and
l is the length of the pair of plates.

For a dipole shear wave source with a pair of elongated piezoelectric plates 5 inches in length, 3/16 inches in width and 1/50 inches in thickness, the peak frequency of peak amplitude may be approximately 2 kHz. Such frequency of peak amplitude may be increased or decreased by varying the thickness and the length of the pair of piezoelectric plates in accordance with the equation above. Such frequency may be increased by increasing the thickness or decreasing the length of the pair of piezoelectric plates and may be decreased by decreasing the thickness or increasing the length of such pair of plates. Thus, if the length of such pair of plates in the example above is reduced from 5 to 4 inches, such frequency is increased from 2 kHz to approximately 3.75 kHz. Since the frequency of peak amplitude is inversely proportional to the square of the length, such frequency is very sensitive to variations in length of the pair of piezoelectric plates. A dipole shear wave source of the length to generate dipole shear waves with the desired frequency of peak amplitude may be chosen if the approximate range of shear wave velocities is known.

If the preferred frequency range of the earth formation is known, piezoelectric plates with the proper dimensions that will generate dipole shear waves with frequencies in such range may be chosen. Thus, if the length and thickness in the direction of vibration of the plates are such that the frequency of peak amplitude is within such preferred frequency range, then the shear wave arrivals generated by such plates will have amplitudes significantly higher than those of compressional wave arrivals also generated by the plates. Since the frequency of peak amplitude is particularly sensitive to the length of the piezoelectric plates, such frequency may be readily selected by selecting piezoelectric plates with the proper length. Such length is not limited by the diameters of the logging sonde and the borehole. Low frequency dipole shear waves can be generated by using plates of sufficient length. Such low frequency dipole shear waves may be important for logging information with low shear wave velocities. Thus the elongated design of the invention enables it to efficiently generate low frequency dipole shear waves.

As discussed above in reference to FIG. 3, the positive and negative compressional waves generated by source 12 will interfere to produce a dipole shear wave in formation 22. The two compressional waves generated, as a practical matter, are usually not exactly opposite in phase. Therefore their interference will also produce a compressional wave in formation 22 and surface waves such as Stoneley waves which are strongest at the fluid borehole interface. The compressional wave and Stoneley wave arrivals are also detected by detectors 14, 16 as noise. Such noise may be reduced as follows. A first logging record is made of the shear wave arrival as described above. Such record will contain compressional wave and Stoneley wave arrivals as noise. The polarity of the electrical signals supplied to source 12 is then reversed by means of polarity switch 58 and a second logging record is made of the shear wave arrival. Because of the reverse in the polarity of the electrical signal the unattached end of the pair of plates will bend in the direction opposite to direction 60 to create a positive compressional wave in the direction of motion and a negative compressional wave in the opposite direction. The two compressional waves so generated will interfere to produce a dipole shear wave in formation 22 that is opposite in polarity to that produced during the first recording. The compressional wave and the Stoneley wave generated during the second recording, however, do not reverse in polarity. Therefore, subtraction of the two logging records will reduce noise caused by compressional waves and Stoneley waves. If the two logging records are added instead of subtracted, the dipole shear wave arrival would substantially disappear but the compressional wave, Stoneley wave and other arrivals will remain. In the preferred frequency ranges for dipole shear wave logging, Stoneley wave arrivals dominate the sum of the records. Therefore, the Stoneley wave appears as the first arrival in the sum of the two records. It is well known that the shear wave velocity of a formation may be derived from its Stoneley wave velocity. How this may be accomplished may be derived from the general discussion in Biot, M.A. 1952, "Propagation of Elastic Waves in a Cylindrical Bore Containing a Fluid", Journal of Applied Physics, Volume 23, Pages 997–1,005.

Dispersion equation (3.14) of the Biot paper illustrates the relationship between Stoneley wave velocity and shear wave velocity along with other borehole parameters, such as the velocities of P waves in the borehole fluid and in the formation, the borehole diameter, the mass density of the borehole fluid, the mass density of the formation, and the wave frequency. The dispersion equation is:

$$4(1 - \zeta_1^2)^{\frac{1}{2}} \left[ \frac{1}{ka} + \frac{K_0(ka)}{K_1(ka)} \right] -$$

$$\left[ \frac{2(2 - \zeta_1^2)^2(1 - \zeta_2^2)^{\frac{1}{2}}}{ma} \right] - \left[ \frac{(2 - \zeta_1^2)^2}{(1 - \zeta_2^2)^{\frac{1}{2}}} \frac{K_0(ma)}{K_1(ma)} \right] =$$

$$\frac{\rho}{\rho_1} \frac{\zeta_1^4}{(1 - \zeta^2)^{\frac{1}{2}}} \frac{I_0[La(1 - \zeta^2)^{\frac{1}{2}}]}{I_1[La(1 - \zeta^2)^{\frac{1}{2}}]},$$

where $\zeta_1 = V/V_s$, $\zeta_2 = V/V_c$, V is the Stoneley wave velocity, $V_c$ is the P wave velocity of the formation, $V_s$ is the S wave velocity of the formation, $\zeta = V/C$, C is the P wave velocity in the borehole fluid, a is the borehole radius, L is equal to $2\pi/\lambda$, $\lambda$ is the wavelength of the Stoneley wave, $m = L(I - \zeta_2^2)^{\frac{1}{2}}$, $k = L(I - \zeta_1^2)^{178}$, $\rho$ is the mass density of the borehole fluid, $\rho_1$ is the mass density of the formation, $K_0(x)$ and $K_1(x)$ are modified Bessel functions of the second kind, respectively, of orders zero and one, and $I_0(x)$ and $I_1(x)$ are modified Bessel functions of the first kind, respectively, of orders zero and one. Using the dispersion equation, one can determine the S wave velocity from the measured Stoneley wave velocity and other known borehole parameters. Thus logging the Stoneley wave velocity provides an alternative method for measuring the shear wave velocity of formation 22.

Noise caused by compressional and Stoneley waves is reduced also by rotating, between two logging recordings, the shear wave source 12 by 180° so that the flat surfaces of the source are facing directions substantially opposite to directions they face before the rotation. The rotation will reverse in polarity the dipole shear waves but not the compressional and Stoneley waves generated. Therefore subtraction of the two logging records will reduce noise caused by compressional and Stoneley waves. Again, in the sum of the two logging records, the Stoneley wave appears as the first arrival.

Where two pairs of piezoelectric plates are used as in the preferred embodiment illustrated in FIG. 4, addition and subtraction of logging records will not be necessary and the Stoneley wave velocity may be logged directly on line. Thus by switching the polarity switch 110, the electrical pulses supplied by the firing and control unit 24 to the two pairs of piezoelectric plates 84 and 86 will be opposite in polarity. Thus, if such pulse causes surface 86a to be at a higher electrical potential than surface 86b after the switch 110 is pulled, the pulse supplied to pair 84 will cause surface 84b to be at a higher electrical potential than surface 84a. With the above arrangement, electrical pulses supplied by the firing and recording control unit 24 will cause surfaces 84a and 86b to move outward towards the windows 96 and to contract away from the windows substantially simultaneously. The dipole component of the acoustic waves created by the two pairs 84 and 86 will substantially cancel and the only significant arrivals detected will be the Stoneley wave arrivals. Therefore the Stoneley wave velocity may be logged on line.

For logging Stoneley wave velocities, the preferred embodiment of FIG. 4 has a better signal to noise ratio than conventional devices employing hollow cylindrical compressional wave sources. Such conventional sources normally operate at about 15 to 20 kHz. At such frequencies, the compressional waves, shear waves and guided waves are not insignificant compared to the Stoneley waves generated by the same conventional source. The frequencies of operation of such conventional sources are inversely related to the diameter of the source. Such frequencies cannot be significantly lowered by increasing the source diameter since it cannot exceed the sonde diameter. The elongated design of the preferred embodiment enables it to operate at frequencies much lower than 15 kHz. At lower frequencies such as 4 to 7 Khz, the compressional waves and other waves generated are insignificant compared to the Stoneley waves.

The shear wave logging device illustrated in FIG. 4 may also be used to determine whether an earth formation surrounding a well is anisotropic. Certain formations are composed of thin horizontal layers of different materials so that the shear wave in the vertical direction may have a velocity different from that of the shear wave propagating in a horizontal direction. Being a transverse wave, a shear wave may vibrate in a plane of polarization. A horizontally propagating shear wave may have a vertical or horizontal plane of polarization or one somewhere in between. The velocity of a horizontally propagating shear wave with a horizontal plane of polarization may be derived from the Stoneley wave velocity measured in a generally vertical well. For a discussion of how this may be done, see White, J. E. and Sengbush, R. L. "Velocity Measurements in Near-Surface Formations" Geophysics Vol. 18, pp. 64–69, 1953. The shear wave velocity of a formation measured directly as discussed above is the velocity of the generally vertically propagating shear wave. Thus if such velocity is different from that derived from the Stoneley wave velocity of the formation, the formation is anisotropic.

The above description of method and construction used is merely illustrated thereof and various changes in shapes, sizes, materials or other details of the method and construction may be within the scope of the appended claims without departing from the spirit of the invention.

We claim:

1. A method of logging the earth surrounding a wall wherein an elongated member having two ends with at least one end attached to a housing which is lowered into a fluid contained by the well, said method comprising the sequential step of:

determining the approximate range of shear wave velocities of the earth surrounding the fluid;

vibrating the unattached portion of the elongated member to create in the fluid a positive compressional wave in one direction and simultaneously a negative compressional wave in the opposite direction, said two compressional waves interfering to produce a dipole shear wave in the earth surrounding the well wherein the frequencies of the dipole shear wave are in the preferred frequency range corresponding to the approximate range of shear wave velocities of the earth surrounding the fluid in accordance with the table below:

| Approximate Range of Shear Wave Velocities | Preferred Frequency Range of Dipole Shear Wave |
|---|---|
| 5000–6000 ft/sec | (10/d)(1.5–7.5) kHz |
| 6000–7000 ft/sec | (10/d)(3–12) kHz |
| 7000–8000 ft/sec | (10/d)(4–16) kHz |
| 8000–9000 ft/sec | (10/d)(4.5–20) kHz | where d is the well diameter in inches; and detecting at at least one selected location spaced longitudinally along the borehole from the member the refracted compressional wave in the fluid caused by refraction of the dipole shear wave.

2. The method of claim 1 wherein the elongated member has length l and substantially uniform thickness t in the direction of vibration selected so that the frequency of peak amplitude f of the dipole shear wave is in the preferred frequency range and so that length l, thickness t, and frequency f satisfy the following relationship:

$$f = Kt/(l)^2$$

where K is a constant.

UNITED STATES PATENT AND TRADEMARK OFFICE
CERTIFICATE OF CORRECTION

PATENT NO. : 4,606,014
DATED : August 12, 1986
INVENTOR(S) : Graham A. Winbow and Sen-Tsuen Chen It is certified that error appears in the above—identified patent and that said Letters Patent is hereby corrected as shown below:

In the specification, Column 4, line 23, delete "lest" and substitute --least-- therefor.

In the specification, Column 8, delete "preffered" spanning lines 26 and 17, and substitute --preferred-- therefor.

In the specification, Column 10, line 33, delete "$m = L(\ell - \zeta_2^2)^{1/2}$, $k = L(\ell - \zeta_1^2)^{178}$" and substitute -- $m = L(1 - \zeta_2^2)^{1/2}$, $k = L(1 - \zeta_1^2)^{1/2}$ -- therefor.

In Claim 1, line 8, delete "wall" and substitute --well--.

In Claim 1, line 10, delete "which".

In Claim 1, line 12, delete "step" and substitute --steps--.

UNITED STATES PATENT AND TRADEMARK OFFICE
CERTIFICATE OF CORRECTION

PATENT NO. :   4,606,014

DATED      :   August 12, 1986

INVENTOR(S) :  Graham A. Winbow and Sen-Tsuen Chen

It is certified that error appears in the above-identified patent and that said Letters Patent is hereby corrected as shown below:

In Claim 2, line 40, delete bold-faced numeral "1" and substitute italics type-face letter  --$l$--.

Signed and Sealed this

Thirteenth Day of January, 1987

*Attest:*

DONALD J. QUIGG

*Attesting Officer*   *Commissioner of Patents and Trademarks*